(12) United States Patent
Shakal et al.

(10) Patent No.: US 11,950,702 B2
(45) Date of Patent: Apr. 9, 2024

(54) NOISE REDUCING PLUNGER

(71) Applicant: Sleep Number Corporation, Minneapolis, MN (US)

(72) Inventors: Anthony John Shakal, Rogers, MN (US); Casey Carlson, Independence, MN (US); Ryan Douglas, Stillwater, MN (US)

(73) Assignee: Sleep Number Corporation, Minneapolis, MN (US)

( * ) Notice: Subject to any disclaimer, the term of this patent is extended or adjusted under 35 U.S.C. 154(b) by 0 days.

(21) Appl. No.: 17/224,936

(22) Filed: Apr. 7, 2021

(65) Prior Publication Data

US 2021/0330090 A1 Oct. 28, 2021

Related U.S. Application Data

(63) Continuation of application No. 15/337,520, filed on Oct. 28, 2016, now Pat. No. 10,993,546.

(51) Int. Cl.
*F16K 31/06* (2006.01)
*A47C 27/08* (2006.01)
*A47C 27/10* (2006.01)
*A47C 31/00* (2006.01)

(52) U.S. Cl.
CPC .......... *A47C 27/082* (2013.01); *A47C 27/083* (2013.01); *A47C 27/10* (2013.01); *A47C 31/008* (2013.01); *F16K 31/0624* (2013.01); *F16K 31/0655* (2013.01); *F16K 31/0658* (2013.01);
(Continued)

(58) Field of Classification Search
CPC ..... A47C 27/082; A47C 27/083; A47C 27/10; A47C 31/008; F16K 31/0625; F16K 31/0655; F16K 31/0689; F16K 25/04; F16K 5/184; F16K 3/243; F16K 3/246; F16K 31/0686–0696; F16J 15/3204; F16J 15/3232; F16J 15/322
USPC ...... 251/129.15–129.22, 357–365, 368, 333; 277/421, 549–577, 418
See application file for complete search history.

(56) References Cited

U.S. PATENT DOCUMENTS

| | | | |
|---|---|---|---|
| 1,804,462 | A | 5/1931 | Eggleston |
| 1,978,737 | A | 10/1934 | Bower |
| 2,353,835 | A | 7/1944 | Lane |

(Continued)

FOREIGN PATENT DOCUMENTS

| | | |
|---|---|---|
| EP | 0168213 | 1/1986 |
| KR | 101628052 B1 * | 6/2016 |
| WO | WO 1997/000634 | 1/1997 |

OTHER PUBLICATIONS

U.S. Appl. No. 14/885,751, filed Oct. 16, 2015, Palashewski et al.

(Continued)

*Primary Examiner* — Craig J Price
(74) *Attorney, Agent, or Firm* — Fish & Richardson P.C.

(57) ABSTRACT

A valve can include a solenoid coil, a plunger having a core configured to respond to a magnetic field generated by the solenoid coil, and a valve disc. The valve disc can be positioned at a head of the core and configured to cushion impact when the valve is closed. A projection can be positioned and configured to cushion impact when the valve is opened. The valve can be used in an air bed system in fluid connection between an air pump and an inflatable air chamber of a mattress.

28 Claims, 10 Drawing Sheets

(52) U.S. Cl.
CPC ...... *F16K 31/0689* (2013.01); *F16K 31/0696* (2013.01)

(56) References Cited

U.S. PATENT DOCUMENTS

| | | | |
|---|---|---|---|
| 2,363,073 A | 11/1944 | Mantz | |
| 2,569,751 A | 10/1951 | Dube | |
| 2,614,584 A | 10/1952 | Goepfrich | |
| 2,616,452 A | 11/1952 | Clay | |
| 2,624,585 A * | 1/1953 | Churchill | F16K 31/423 251/30.05 |
| 2,685,906 A | 8/1954 | Williams | |
| 2,799,293 A | 7/1957 | Clay | |
| 2,812,776 A * | 11/1957 | Lofftus | F16K 31/0627 137/625.5 |
| 2,842,400 A | 7/1958 | Boothjackj | |
| 2,861,594 A | 11/1958 | Collins | |
| 2,886,063 A | 5/1959 | Ray | |
| 2,888,233 A | 5/1959 | Windsor | |
| 2,998,817 A | 9/1961 | Armstrong | |
| 2,999,192 A | 9/1961 | Lambert | |
| 3,013,768 A | 12/1961 | La Mastra | |
| 3,022,799 A | 2/1962 | Padula | |
| 3,073,345 A | 1/1963 | Hagler | |
| 3,134,932 A | 5/1964 | Ray | |
| 3,155,367 A | 11/1964 | Gifford | |
| 3,171,439 A | 3/1965 | Lansky | |
| 3,176,954 A | 4/1965 | Cameron | |
| 3,185,177 A | 5/1965 | Brandenberg | |
| 3,203,447 A | 8/1965 | Bremner | |
| 3,232,312 A | 2/1966 | Lansky | |
| 3,263,959 A | 8/1966 | Wisniewski | |
| 3,285,616 A | 11/1966 | Doutt | |
| 3,295,079 A | 12/1966 | Brown | |
| 3,324,889 A | 6/1967 | Batts | |
| 3,429,552 A | 2/1969 | Erickson | |
| 3,446,473 A | 5/1969 | Barker | |
| 3,459,404 A | 8/1969 | Wisniewski | |
| 3,484,076 A | 12/1969 | Naumann | |
| 3,513,876 A | 5/1970 | Tarbox | |
| 3,521,851 A | 7/1970 | Sorrow | |
| 3,552,436 A | 1/1971 | Stewart | |
| 3,608,585 A | 9/1971 | Huntington | |
| 3,630,482 A | 12/1971 | Beller | |
| 3,650,573 A | 3/1972 | Inada | |
| 3,670,274 A | 6/1972 | Ellison | |
| 3,733,047 A | 5/1973 | Allen | |
| 3,750,693 A * | 8/1973 | Hardison | F16K 31/0655 137/220 |
| 3,784,154 A | 1/1974 | Ostrowski | |
| 3,784,994 A | 1/1974 | Kery | |
| 3,799,570 A | 3/1974 | Giordano | |
| 3,840,959 A | 10/1974 | Allen | |
| 3,872,878 A | 3/1975 | Kozel | |
| 3,913,460 A | 10/1975 | Lee | |
| 3,951,378 A | 4/1976 | Manor | |
| 3,977,734 A | 8/1976 | Ronnhult | |
| 4,020,814 A | 5/1977 | Hewitt | |
| 4,057,300 A | 11/1977 | Michellone | |
| 4,065,096 A | 12/1977 | Frantz | |
| 4,102,526 A | 7/1978 | Hargraves | |
| 4,130,188 A | 12/1978 | Askew | |
| 4,132,237 A | 1/1979 | Kennedy | |
| 4,159,026 A | 6/1979 | Williamson | |
| 4,167,200 A | 9/1979 | Bouteille | |
| 4,270,504 A * | 6/1981 | Sciotti | F02M 5/08 137/625.5 |
| 4,322,057 A | 3/1982 | Yamanaka | |
| 4,326,696 A | 4/1982 | Ishikawa | |
| 4,336,920 A | 6/1982 | Murray | |
| 4,341,241 A | 7/1982 | Baker | |
| 4,403,765 A | 9/1983 | Fisher | |
| 4,417,717 A | 11/1983 | Moller | |
| 4,424,830 A | 1/1984 | Arnsperger | |
| 4,427,022 A | 1/1984 | Forney | |
| 4,432,391 A | 2/1984 | Ott | |
| 4,491,157 A | 1/1985 | Hashimoto | |
| 4,522,372 A | 6/1985 | Yano | |
| 4,527,298 A | 7/1985 | Moulton | |
| 4,531,547 A | 7/1985 | Hadden | |
| 4,531,708 A | 7/1985 | Livet | |
| 4,538,129 A | 8/1985 | Fisher | |
| 4,548,389 A | 10/1985 | Smith | |
| 4,582,294 A | 4/1986 | Fargo | |
| 4,583,566 A | 4/1986 | Kalavitz et al. | |
| 4,598,736 A | 7/1986 | Chorkey | |
| 4,606,199 A | 8/1986 | Gotzenberger | |
| 4,624,282 A | 11/1986 | Fargo | |
| 4,647,011 A | 3/1987 | Contzen | |
| 4,651,971 A | 3/1987 | Donahue, Jr. | |
| 4,681,142 A | 7/1987 | Woeller | |
| 4,718,448 A | 1/1988 | Love | |
| 4,720,078 A | 1/1988 | Nakamura | |
| 4,728,916 A | 3/1988 | Fontecchio | |
| 4,745,647 A | 5/1988 | Goodwin | |
| 4,753,416 A | 6/1988 | Inagaki | |
| 4,766,628 A | 8/1988 | Greer et al. | |
| 4,788,729 A | 12/1988 | Greer et al. | |
| 4,790,352 A | 12/1988 | Dietiker | |
| 4,797,962 A | 1/1989 | Goode | |
| D300,194 S | 3/1989 | Walker | |
| 4,829,616 A | 5/1989 | Walker | |
| 4,830,333 A | 5/1989 | Watson | |
| 4,832,582 A | 5/1989 | Buffet | |
| 4,858,886 A | 8/1989 | Tatara | |
| 4,862,921 A | 9/1989 | Hess | |
| 4,890,344 A | 1/1990 | Walker | |
| 4,897,890 A | 2/1990 | Walker | |
| 4,901,702 A | 2/1990 | Beicht | |
| 4,901,974 A | 2/1990 | Cook | |
| 4,908,895 A | 3/1990 | Walker | |
| 4,910,487 A | 3/1990 | Kleinhappl | |
| 4,915,124 A | 4/1990 | Sember, III | |
| 4,921,011 A | 5/1990 | Kelly | |
| 4,936,339 A | 6/1990 | Bennett | |
| 4,944,276 A | 7/1990 | House | |
| 4,945,588 A | 8/1990 | Cassidy et al. | |
| 4,961,561 A | 10/1990 | Kamibayasi | |
| 4,967,786 A | 11/1990 | DuHack | |
| D313,973 S | 1/1991 | Walker | |
| 4,991,244 A | 2/1991 | Walker | |
| 5,003,654 A | 4/1991 | Vrzalik | |
| 5,010,923 A | 4/1991 | Kouda | |
| 5,032,812 A | 7/1991 | Banick | |
| 5,069,188 A | 12/1991 | Cook | |
| 5,083,546 A | 1/1992 | Detweiler | |
| 5,088,520 A | 2/1992 | Haynes | |
| 5,095,568 A | 3/1992 | Thomas et al. | |
| 5,118,072 A | 6/1992 | Sakamoto | |
| 5,127,624 A | 7/1992 | Domke | |
| 5,142,717 A | 9/1992 | Everard et al. | |
| 5,144,706 A | 9/1992 | Walker et al. | |
| 5,152,319 A | 10/1992 | Hannagan et al. | |
| 5,170,364 A | 12/1992 | Gross et al. | |
| 5,170,522 A | 12/1992 | Walker | |
| 5,183,022 A | 2/1993 | Cook | |
| 5,193,986 A | 3/1993 | Grant et al. | |
| 5,199,456 A | 4/1993 | Love et al. | |
| 5,232,353 A | 8/1993 | Grant | |
| 5,235,713 A | 8/1993 | Guthrie et al. | |
| 5,237,980 A | 8/1993 | Gillier | |
| 5,246,199 A | 9/1993 | Numoto | |
| 5,289,841 A | 3/1994 | Maranzano | |
| 5,303,012 A | 4/1994 | Horlacher | |
| 5,325,551 A | 7/1994 | Tappel et al. | |
| 5,325,838 A | 7/1994 | Bennett | |
| 5,326,070 A | 7/1994 | Baron | |
| 5,333,643 A | 8/1994 | Gilchrist | |
| 5,345,629 A | 9/1994 | Ferrand | |
| 5,379,794 A | 1/1995 | Brown | |
| 5,413,141 A | 5/1995 | Dietiker | |
| 5,425,147 A | 6/1995 | Supplee et al. | |
| 5,447,287 A | 9/1995 | Kelly | |
| 5,454,399 A | 10/1995 | Kazakis | |

(56) References Cited

U.S. PATENT DOCUMENTS

| | | |
|---|---|---|
| 5,467,961 A | 11/1995 | Sausner |
| D368,475 S | 4/1996 | Scott |
| 5,503,366 A | 4/1996 | Zabeck |
| 5,509,154 A | 4/1996 | Shafer et al. |
| 5,509,155 A | 4/1996 | Zigarac et al. |
| 5,538,219 A | 7/1996 | Osterbrink |
| 5,542,136 A | 8/1996 | Tappel |
| 5,553,829 A | 9/1996 | Hemsen |
| 5,564,140 A | 10/1996 | Shoenhair et al. |
| 5,565,832 A | 10/1996 | Haller |
| 5,579,741 A * | 12/1996 | Cook ............... F02M 25/0836 251/129.05 |
| 5,586,347 A | 12/1996 | Frischknecht |
| 5,594,963 A | 1/1997 | Berkowitz |
| 5,642,546 A | 6/1997 | Shoenhair |
| 5,649,687 A | 7/1997 | Rosas |
| 5,652,484 A | 7/1997 | Shafer et al. |
| 5,655,746 A | 8/1997 | Goubely |
| 5,704,395 A | 1/1998 | Kim |
| 5,709,370 A | 1/1998 | Kah, Jr. |
| 5,765,246 A | 7/1998 | Osterbrink |
| 5,775,670 A | 7/1998 | Osterbrink |
| 5,794,288 A | 8/1998 | Soltani et al. |
| 5,815,864 A | 10/1998 | Sloop |
| 5,903,941 A | 5/1999 | Shafer et al. |
| 5,904,172 A | 5/1999 | Gifft et al. |
| 5,937,884 A | 8/1999 | Barnoin |
| 5,947,239 A | 9/1999 | Koelzer |
| 5,947,442 A | 9/1999 | Shurman |
| 5,967,487 A | 10/1999 | Cook |
| 5,991,949 A | 11/1999 | Miller, Sr. et al. |
| 5,992,461 A | 11/1999 | Gilmore |
| 6,003,839 A | 12/1999 | Kobayashi |
| 6,019,344 A | 2/2000 | Engel |
| 6,037,723 A | 3/2000 | Shafer et al. |
| 6,047,718 A | 4/2000 | Kansky |
| 6,050,542 A | 4/2000 | Johnson |
| 6,065,734 A | 5/2000 | Tackett |
| 6,070,606 A | 6/2000 | Swanson |
| 6,076,550 A | 6/2000 | Hiraishi |
| 6,076,801 A | 6/2000 | DuHack |
| 6,086,042 A | 7/2000 | Scott |
| 6,092,249 A | 7/2000 | Kamen et al. |
| 6,105,616 A | 8/2000 | Sturman |
| 6,108,844 A | 8/2000 | Kraft et al. |
| 6,144,275 A | 11/2000 | Hirata |
| 6,161,231 A | 12/2000 | Kraft et al. |
| 6,193,212 B1 | 2/2001 | Ohmi |
| 6,202,239 B1 | 3/2001 | Ward et al. |
| 6,202,672 B1 | 3/2001 | Ellis et al. |
| 6,213,572 B1 | 4/2001 | Linkner, Jr. |
| 6,219,903 B1 | 4/2001 | Osterhart |
| 6,225,886 B1 | 5/2001 | Kleinert |
| 6,231,321 B1 | 5/2001 | Fukudome |
| 6,263,908 B1 | 7/2001 | Love |
| 6,293,516 B1 | 9/2001 | Parsons |
| 6,305,662 B1 | 10/2001 | Parsons |
| 6,347,616 B1 | 2/2002 | Rodriguez |
| 6,397,419 B1 | 6/2002 | Mechache |
| 6,405,757 B1 | 6/2002 | Jabcon |
| 6,422,258 B1 | 7/2002 | DuHack |
| 6,425,409 B1 | 7/2002 | Cross |
| 6,450,590 B1 | 9/2002 | Leventhal |
| 6,453,930 B1 | 9/2002 | Linkner, Jr. |
| 6,463,951 B2 | 10/2002 | Shost |
| 6,467,495 B2 | 10/2002 | Shost |
| 6,483,264 B1 | 11/2002 | Shafer et al. |
| 6,572,077 B1 | 6/2003 | Juergen |
| 6,595,485 B2 | 7/2003 | Burrola |
| 6,666,192 B2 | 12/2003 | Rodriguez |
| 6,686,711 B2 | 2/2004 | Rose et al. |
| 6,708,357 B2 | 3/2004 | Gaboury et al. |
| 6,722,626 B2 | 4/2004 | Balsdon |
| 6,739,573 B1 | 5/2004 | Balsdon |
| 6,763,541 B2 | 7/2004 | Mahoney et al. |
| 6,766,819 B2 | 7/2004 | Shost |
| 6,804,848 B1 | 10/2004 | Rose |
| 6,805,331 B2 | 10/2004 | Burrola |
| 6,830,232 B2 | 12/2004 | Burrola |
| 6,832,397 B2 | 12/2004 | Gaboury |
| 6,840,504 B2 | 1/2005 | Hagiwara et al. |
| D502,929 S | 3/2005 | Copeland et al. |
| 6,883,191 B2 | 5/2005 | Gaboury et al. |
| 6,899,118 B1 | 5/2005 | Pumm |
| 6,935,612 B2 | 8/2005 | McCombs |
| 6,948,697 B2 | 9/2005 | Herbert |
| 6,955,337 B2 | 10/2005 | Weber |
| 7,146,824 B2 | 12/2006 | Ohno |
| 7,159,840 B2 | 1/2007 | Young et al. |
| 7,261,121 B2 | 8/2007 | Bordonaro |
| 7,261,122 B2 | 8/2007 | Bordonaro |
| 7,367,636 B2 | 5/2008 | Ho |
| 7,389,554 B1 | 6/2008 | Rose |
| 7,401,762 B2 * | 7/2008 | Ohmori ............ H01M 8/04156 137/340 |
| 7,503,346 B1 * | 3/2009 | Clark ................... F16K 31/402 137/625.65 |
| 7,748,684 B2 | 7/2010 | Ito |
| 7,815,164 B2 | 10/2010 | Dong |
| 7,865,988 B2 | 1/2011 | Koughan et al. |
| 7,918,434 B2 | 4/2011 | Petersen |
| 8,104,510 B2 | 1/2012 | Ams |
| 8,172,197 B2 | 5/2012 | Gu |
| 8,186,370 B2 | 5/2012 | Cloud |
| 8,235,064 B2 | 8/2012 | Kasprzyk |
| 8,282,452 B2 | 10/2012 | Grigsby et al. |
| 8,297,314 B2 * | 10/2012 | Clark ................. F16K 31/0627 137/625.5 |
| 8,336,369 B2 | 12/2012 | Mahoney |
| 8,393,346 B2 | 3/2013 | Curtis |
| 8,444,558 B2 | 5/2013 | Young et al. |
| 8,506,290 B2 | 8/2013 | Deng |
| D691,118 S | 10/2013 | Ingham et al. |
| 8,550,112 B2 | 10/2013 | Bertelli |
| 8,561,644 B2 | 10/2013 | Schultz |
| 8,576,032 B2 | 11/2013 | Herbert |
| D697,874 S | 1/2014 | Stusynski et al. |
| D698,338 S | 1/2014 | Ingham |
| D701,536 S | 3/2014 | Sakai |
| 8,672,421 B2 | 3/2014 | Eidenschink |
| 8,672,853 B2 | 3/2014 | Young |
| 8,746,275 B2 | 6/2014 | Santinanavat |
| 8,752,541 B2 | 6/2014 | Deng |
| 8,769,747 B2 | 7/2014 | Mahoney et al. |
| 8,814,131 B2 | 8/2014 | Lee |
| 8,832,886 B2 | 9/2014 | Riley et al. |
| 8,893,339 B2 | 11/2014 | Fleury |
| 8,931,329 B2 | 1/2015 | Mahoney et al. |
| 8,960,638 B2 | 2/2015 | Da Pont et al. |
| 8,966,689 B2 | 3/2015 | McGuire et al. |
| 8,973,183 B1 | 3/2015 | Palashewski et al. |
| 8,984,687 B2 | 3/2015 | Stusynski et al. |
| 9,004,447 B2 | 4/2015 | Tung et al. |
| D737,250 S | 8/2015 | Ingham et al. |
| 9,131,781 B2 | 9/2015 | Zaiss et al. |
| 9,140,451 B2 | 9/2015 | Haedicke et al. |
| 9,353,886 B2 | 5/2016 | Tung |
| 9,370,457 B2 | 6/2016 | Nunn et al. |
| 9,392,879 B2 | 7/2016 | Nunn et al. |
| 9,458,612 B2 | 10/2016 | Thomas et al. |
| 9,488,097 B2 | 11/2016 | Steinman |
| 9,506,569 B2 | 11/2016 | Moren |
| 9,510,688 B2 | 12/2016 | Nunn et al. |
| 9,599,232 B2 | 3/2017 | Yoshimura |
| 9,637,099 B2 | 5/2017 | Eidenschink |
| 9,677,683 B2 | 6/2017 | Hermansson |
| 9,695,954 B2 | 7/2017 | Pont et al. |
| 9,730,524 B2 | 8/2017 | Chen et al. |
| 9,737,154 B2 | 8/2017 | Mahoney et al. |
| 9,770,114 B2 | 9/2017 | Brosnan et al. |
| 9,982,797 B2 | 5/2018 | Ye |
| 10,100,945 B2 | 10/2018 | Dong |
| 10,149,549 B2 | 12/2018 | Erko et al. |
| 10,152,065 B2 | 12/2018 | Ok |

(56) References Cited

U.S. PATENT DOCUMENTS

| | | | |
|---|---|---|---|
| 10,242,786 B2 | 3/2019 | Raff | |
| 10,408,361 B2 | 9/2019 | Jin | |
| 10,422,432 B2 | 9/2019 | Kuzuya | |
| 10,458,366 B2 | 10/2019 | Brock | |
| 10,619,755 B2 | 4/2020 | Carlson | |
| 10,626,996 B2 | 4/2020 | Voss | |
| 10,830,371 B2 * | 11/2020 | Raff | F16K 31/0606 |
| 11,612,257 B2 * | 3/2023 | Yen | F16K 31/0655 5/706 |
| 2001/0037832 A1 | 11/2001 | Weiss | |
| 2002/0125451 A1 | 9/2002 | Ben-Asher | |
| 2004/0069355 A1 | 4/2004 | Sollier | |
| 2004/0195537 A1 | 10/2004 | Weber et al. | |
| 2004/0232372 A1 | 11/2004 | Mccombs | |
| 2005/0044631 A1 | 3/2005 | Wang | |
| 2005/0045844 A1 | 3/2005 | Burrola | |
| 2005/0166979 A1 | 8/2005 | Berger | |
| 2007/0069166 A1 | 3/2007 | Sisk | |
| 2007/0251588 A1 | 11/2007 | Linder | |
| 2008/0047618 A1 | 2/2008 | Ishikawa | |
| 2008/0077020 A1 | 3/2008 | Young et al. | |
| 2008/0203339 A1 | 8/2008 | Kato | |
| 2008/0210897 A1 | 9/2008 | Wagner | |
| 2008/0272208 A1 | 11/2008 | Anderson | |
| 2009/0039302 A1 | 2/2009 | Giacomini | |
| 2009/0094740 A1 | 4/2009 | Ji | |
| 2010/0108927 A1 | 5/2010 | Perz et al. | |
| 2010/0282988 A1 | 11/2010 | Kasprzyk | |
| 2011/0094040 A1 | 4/2011 | DeGreef | |
| 2011/0095216 A1 | 4/2011 | deGreef | |
| 2011/0144455 A1 | 6/2011 | Young et al. | |
| 2012/0318242 A1 | 12/2012 | Roh et al. | |
| 2013/0168584 A1 | 7/2013 | Tung | |
| 2014/0182061 A1 | 7/2014 | Zaiss | |
| 2014/0191549 A1 | 7/2014 | Hermansson | |
| 2014/0246615 A1 | 9/2014 | Volz | |
| 2014/0250597 A1 | 9/2014 | Chen et al. | |
| 2014/0257571 A1 | 9/2014 | Chen et al. | |
| 2014/0259417 A1 | 9/2014 | Nunn et al. | |
| 2014/0259418 A1 | 9/2014 | Nunn et al. | |
| 2014/0259431 A1 | 9/2014 | Fleury | |
| 2014/0259433 A1 | 9/2014 | Nunn et al. | |
| 2014/0259434 A1 | 9/2014 | Nunn et al. | |
| 2014/0277611 A1 | 9/2014 | Nunn et al. | |
| 2014/0277778 A1 | 9/2014 | Nunn et al. | |
| 2014/0277822 A1 | 9/2014 | Nunn et al. | |
| 2015/0007393 A1 | 1/2015 | Palashewski | |
| 2015/0025327 A1 | 1/2015 | Young et al. | |
| 2015/0026896 A1 | 1/2015 | Fleury et al. | |
| 2015/0108382 A1 | 4/2015 | Svensson | |
| 2015/0157137 A1 | 6/2015 | Nunn et al. | |
| 2015/0157519 A1 | 6/2015 | Stusynski et al. | |
| 2015/0182033 A1 | 7/2015 | Brosnan et al. | |
| 2015/0182397 A1 | 7/2015 | Palashewski et al. | |
| 2015/0182399 A1 | 7/2015 | Palashewski et al. | |
| 2015/0182418 A1 | 7/2015 | Zaiss | |
| 2015/0290059 A1 | 10/2015 | Brosnan et al. | |
| 2015/0366366 A1 | 12/2015 | Zaiss et al. | |
| 2015/0374137 A1 | 12/2015 | Mahoney et al. | |
| 2016/0061340 A1 | 3/2016 | Shen | |
| 2016/0100696 A1 | 4/2016 | Palashewski et al. | |
| 2016/0192886 A1 | 7/2016 | Nunn et al. | |
| 2016/0242562 A1 | 8/2016 | Karschnik et al. | |
| 2016/0338871 A1 | 11/2016 | Nunn et al. | |
| 2016/0367039 A1 | 12/2016 | Young et al. | |
| 2017/0003666 A1 | 1/2017 | Nunn et al. | |
| 2017/0035212 A1 | 2/2017 | Nunn et al. | |
| 2017/0049243 A1 | 2/2017 | Nunn et al. | |
| 2017/0196369 A1 | 7/2017 | Nunn et al. | |
| 2017/0303697 A1 | 10/2017 | Chen et al. | |
| 2017/0318980 A1 | 11/2017 | Mahoney et al. | |
| 2018/0116418 A1 | 5/2018 | Shakal et al. | |
| 2019/0346065 A1 | 11/2019 | Byle | |
| 2020/0124759 A1 | 4/2020 | Sugiura | |
| 2020/0132211 A1 | 4/2020 | Sugiura | |

OTHER PUBLICATIONS

U.S. Appl. No. 15/337,034, filed Oct. 28, 2016, Karschnik et al.
U.S. Appl. No. 15/337,470, filed Oct. 28, 2016, Shakal et al.
U.S. Appl. No. 15/337,484, filed Oct. 28, 2016, Shakal.
U.S. Appl. No. 15/337,520, filed Oct. 28, 2016, Shakal et al.
U.S. Appl. No. 15/347,572, filed Nov. 9, 2016, Peterson et al.
U.S. Appl. No. 15/684,503, filed Aug. 23, 2017, Rose et al.
U.S. Appl. No. 15/687,796, filed Aug. 28, 2017, Brosnan et al.
U.S. Appl. No. 15/806,810, filed Nov. 8, 2017, Gaunt.
U.S. Appl. No. 15/807,002, filed Nov. 8, 2017, Peterson et al.
U.S. Appl. No. 29/577,797, filed Sep. 15, 2016, Karschnik et al.
U.S. Appl. No. 29/583,852, filed Nov. 9, 2016, Keeley.
U.S. Appl. No. 29/583,879, filed Nov. 9, 2016, Keeley et al.
PCT International Search Report and Written Opinion in International Appln. No. PCT/US2017/058052, dated Dec. 1, 2017, 8 pages.
PCT International Preliminary Report on Patentability in Appln. No. PCT/US2017/058052, dated Apr. 30, 2019, 6 pages.

* cited by examiner

NOISE REDUCING PLUNGER

CROSS-REFERENCE TO RELATED APPLICATIONS

This application claims the benefit of U.S. Utility application Ser. No. 15/337,520, Oct. 28, 2016. The disclosure of the prior application is considered part of (and is incorporated by reference in) the disclosure of this application.

TECHNICAL FIELD

This invention relates to valves, and more particularly to plungers of air valves for use in air beds.

BACKGROUND

People have traditionally used beds that come in many shapes, sizes, and styles. Such beds can range from extremely simple designs to rather complex designs that include a variety of features. For example, some beds can have one or more inflatable air chambers. Some of such beds can include an inflation system including a number of mechanical and electrical components. For example, some beds can include one or more pumps with one or more valves for inflating the air chambers.

SUMMARY

Some embodiments of a pump system can include one or more of the features and functions disclosed herein. Some embodiments can include a solenoid valve with one or more means for reducing noise during actuation of the valve. A projection can be positioned to cushion impact when the valve is opened. The valve can have a plunger with a core having a head connected to a valve disc in a manner that is configured to dampen impact when the valve closes and impacts the valve seat, thus reducing sound. A chamfered or rounded head can interact with the valve seat in a way that allows the valve head to bulge when closed, dampening impact, and also creating an air gap that (along with elastomer material of the valve disc) acts as a dampened spring. This can be particularly desirable in inflatable air beds where noise can be undesirable, especially during sleep of a user. Various embodiments can be configured with components having particular shapes and features.

In one aspect, a valve can include a solenoid coil, a plunger having a core configured to respond to a magnetic field generated by the solenoid coil, and a valve disc. The valve disc can be positioned at a head of the core and configured to cushion impact when the valve is closed. A projection can be positioned and configured to cushion impact when the valve is opened. The valve can be used in an air bed system in fluid connection between an air pump and an inflatable air chamber of a mattress.

Some of the implementations described herein may optionally include one or more of the following features. The valve disc defines a receptacle, the head of the core is positioned in the receptacle, and a front surface of the head of the core and an opposing surface in the receptacle of the valve disc are shaped to space at least part of the front surface from the opposing surface. The head of the core comprises a chamfered front surface. The head of the core abuts an opposing surface of the valve disc at a center of the head and is spaced from the opposing surface near a rim of the head. The projection is a bumper extending from a tail end of the core. The projection is a nub extending from the valve disc in a direction opposite of a forward-facing face of the valve disc. The valve further includes a core tube, a core spring, a seal insert, and a valve seat. The core spring is positioned between the seal insert and the core so as to bias the core away from the seal insert such that the valve disc contacts the valve seat when the solenoid is not energized. The valve is configured such that the core spring is compressed until the projection abuts a stop when the solenoid is energized. The valve comprises a valve seat having a diameter larger than that of the head of the core and less than that of the valve disc. The valve is configured such that the valve disc bulges into a hole defined by the valve seat when the valve is closed. A circumferential edge of the valve seat has a radius of between 0.030 and 0.200 millimeters and wherein the valve disc contacts the circumferential edge when the valve is closed. The core defines a receptacle at the tail end of the core opposite the valve disc and the projection comprises a bumper positioned partially in the receptacle and extending from the tail end of the core. The valve disc comprises a first elastomer and the projection comprises a second elastomer different than the first elastomer. The air bed further includes means for quieting impact of the valve disc when the valve is closed.

In another aspect, a valve includes a solenoid coil, a plunger having a core configured to respond to a magnetic field generated by the solenoid coil, and a valve disc positioned at a head of the core and configured to cushion impact when the valve is closed. A projection is positioned and configured to cushion impact when the valve is opened.

Some of the implementations described herein may optionally include one or more of the following features. The valve disc defines a receptacle and a proximal face having a sealing surface, the head of the core is positioned in the receptacle, and a front surface of the head of the core and an opposing surface in the receptacle of the valve disc are shaped to space at least part of the front surface from the opposing surface. The head of the core includes a chamfered front surface such that a center of the head of the core abuts an opposing surface of the valve disc and an outer portion of the head is spaced from the opposing surface of the valve disc. The valve comprises a valve seat having a diameter larger than that of the head of the core and less than that of the valve disc. The core defines a receptacle at the tail end of the core and the projection comprises a bumper positioned partially in the receptacle and extending from the tail end of the core. The valve disc comprises a first elastomer configured for dampening and sealing and the projection comprises a second elastomer different than the first elastomer.

The details of one or more embodiments of the invention are set forth in the accompanying drawings and the description below. Other features, objects, and advantages of the invention will be apparent from the description and drawings, and from the claims.

DESCRIPTION OF DRAWINGS

Like reference symbols in the various drawings indicate like elements.

DETAILED DESCRIPTION

An air controller, such as for inflatable air beds, can have a pump and one or more valves. Such a valve can be configured with one or more features configured for reducing noise during operation of the valve by dampening impact when the valve is opened and/or closed. This can be particularly desirable in inflatable air beds where noise can be undesirable, especially during sleep of a user.

Figure 1:
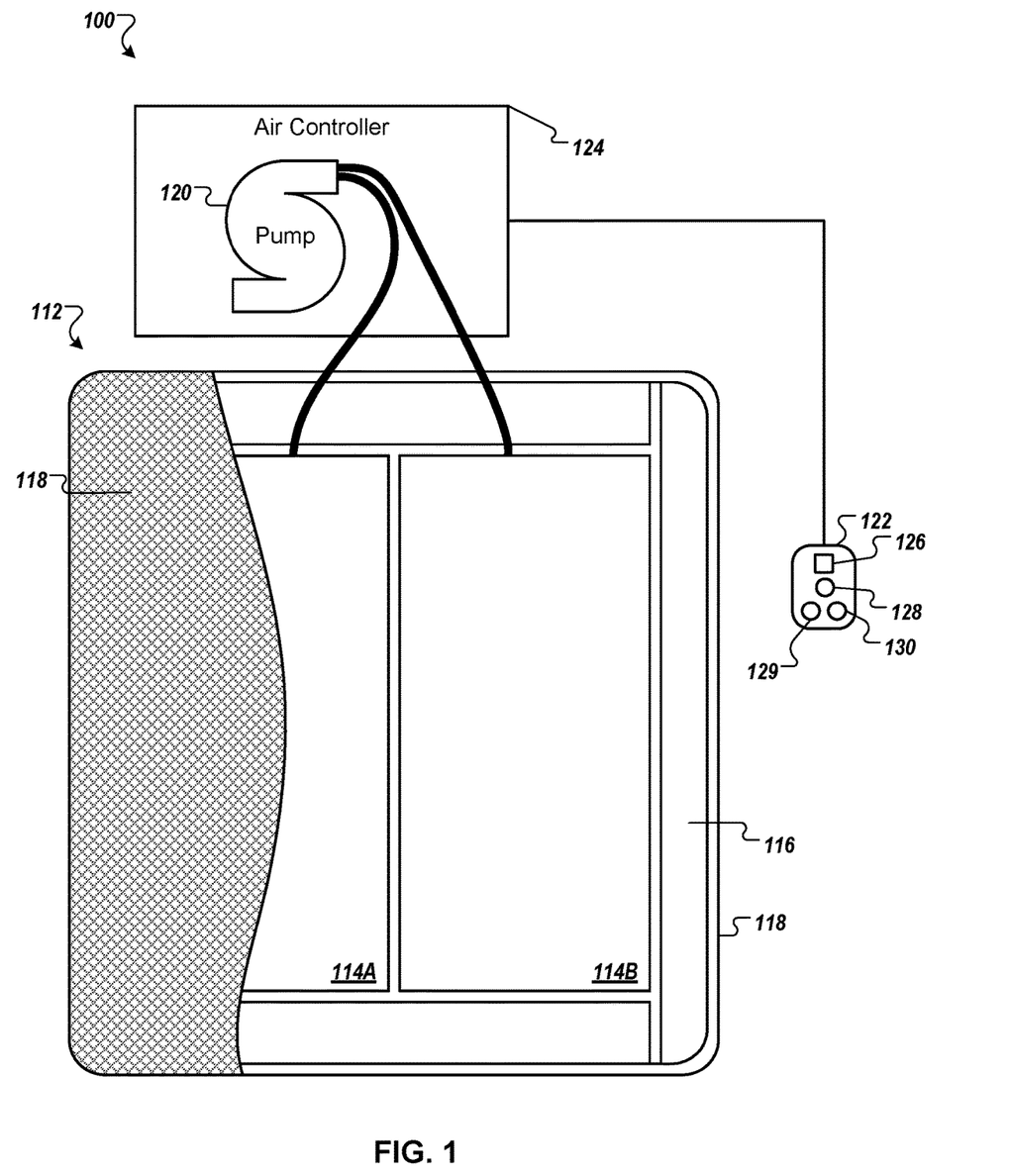
FIG. 1 shows an example air bed system.

FIG. 1 shows an example air bed system 100 that includes a bed 112. The bed 112 includes at least one air chamber 114 surrounded by a resilient border 116 and encapsulated by bed ticking 118. The resilient border 116 can comprise any suitable material, such as foam.

As illustrated in FIG. 1, the bed 112 can be a two chamber design having first and second fluid chambers, such as a first air chamber 114A and a second air chamber 114B. In alternative embodiments, the bed 112 can include chambers for use with fluids other than air that are suitable for the application. In some embodiments, such as single beds or kids' beds, the bed 112 can include a single air chamber 114A or 114B or multiple air chambers 114A and 114B. The first and second air chambers 114A and 114B can be in fluid communication with a pump 120. The pump 120 can be part of an air controller 124, which can be in electrical communication with a remote control 122. The air controller 124 can include a wired or wireless communications interface for communicating with one or more devices, including the remote control 122. The air controller 124 can be configured to operate the pump 120 to cause increases and decreases in the fluid pressure of the first and second air chambers 114A and 114B based upon commands input by a user using the remote control 122. In some implementations, the pump 120 and the air controller 124 can be integrated into a common housing. In other embodiments, the air controller 124 and the pump 120 can be in separate housings.

The remote control 122 can include a display 126, an output selecting mechanism 128, a pressure increase button 129, and a pressure decrease button 130. The output selecting mechanism 128 can allow the user to switch air flow generated by the pump 120 between the first and second air chambers 114A and 114B, thus enabling control of multiple air chambers with a single remote control 122 and a single pump 120. For example, the output selecting mechanism 128 can by a physical control (e.g., switch or button) or an input control displayed on display 126. Alternatively, separate remote control units can be provided for each air chamber and can each include the ability to control multiple air chambers. Pressure increase and decrease buttons 129 and 130 can allow a user to increase or decrease the pressure, respectively, in the air chamber selected with the output selecting mechanism 128. Adjusting the pressure within the selected air chamber can cause a corresponding adjustment to the firmness of the respective air chamber. In some embodiments, the remote control 122 can be omitted or modified as appropriate for an application. For example, in some embodiments the bed 112 can be controlled by a computer, tablet, smart phone, or other device in wired or wireless communication with the bed 112.

Figure 2:
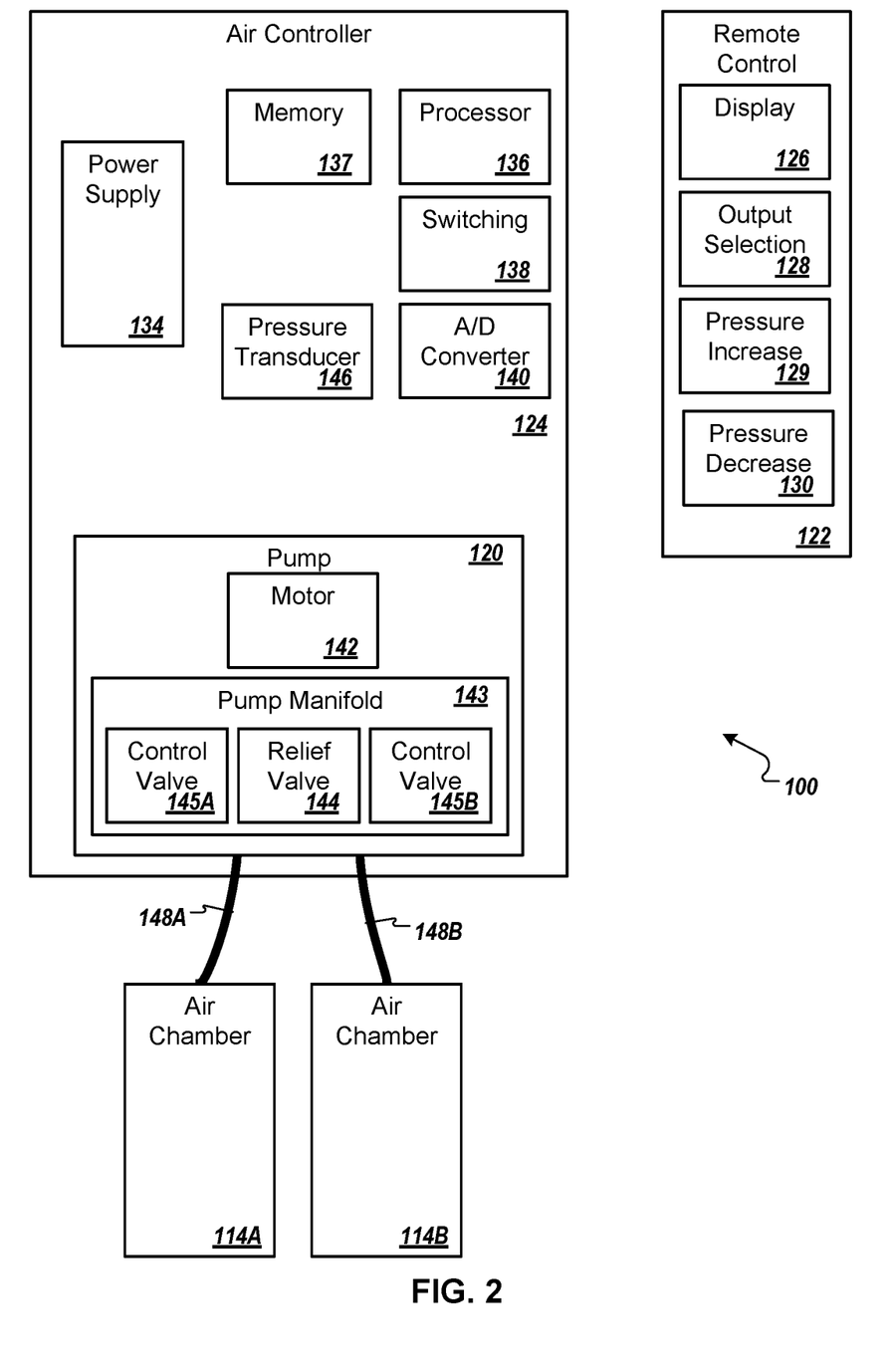
FIG. 2 is a block diagram of an example of various components of an air bed system.

FIG. 2 is a block diagram of an example of various components of an air bed system. For example, these components can be used in the example air bed system 100. As shown in FIG. 2, the air controller 124 can include the pump 120, a power supply 134, a processor 136, a memory 137, a switching mechanism 138, and an analog to digital (A/D) converter 140, an air manifold 143 (having valves 144, 145A, and 145B), and one or more pressure transducers 146. The switching mechanism 138 can be, for example, a relay or a solid state switch.

The pump 120 can include a motor 142. The pump 120 can be fluidly connected to the pump manifold, which is fluidically connected with the first air chamber 114A and the second air chamber 114B via a first tube 148A and a second tube 148B, respectively. The first and second control valves 145A and 145B can be controlled by switching mechanism 138, and are operable to regulate the flow of fluid between the pump 120 and first and second air chambers 114A and 114B, respectively.

In some implementations, the pump 120 and the air controller 124 can be provided and packaged as a single unit. In some alternative implementations, the pump 120 and the air controller 124 can be provided as physically separate units. In some implementations, the air controller 124, the pump 120, or both are integrated within or otherwise contained within a bed frame or bed support structure that supports the bed 112. In some implementations, the air controller 124, the pump 120, or both are located outside of a bed frame or bed support structure (as shown in the example in FIG. 1).

The example air bed system 100 depicted in FIG. 2 includes the two air chambers 114A and 114B and the single pump 120. However, other implementations can include an air bed system having two or more air chambers and one or more pumps incorporated into the air bed system to control the air chambers. For example, a separate pump can be associated with each air chamber of the air bed system or a pump can be associated with multiple chambers of the air bed system. Separate pumps can allow each air chamber to be inflated or deflated independently and simultaneously. Furthermore, additional pressure transducers can also be incorporated into the air bed system such that, for example, a separate pressure transducer can be associated with each air chamber.

In use, the processor 136 can, for example, send a decrease pressure command for one of the air chambers 114A or 114B, and the switching mechanism 138 can be used to convert the low voltage command signals sent by the processor 136 to higher operating voltages sufficient to operate the relief valve 144 of the pump 120 and open the control valve 145A or 145B. Opening the relief valve 144 can allow air to escape from the air chamber 114A or 114B through the respective air tube 148A or 148B. During deflation, the pressure transducer 146 can send pressure readings to the processor 136 via the A/D converter 140. The A/D converter 140 can receive analog information from pressure transducer 146 and can convert the analog information to digital information useable by the processor 136. The processor 136 can send the digital signal to the remote control 122 to update the display 126 in order to convey the pressure information to the user.

As another example, the processor 136 can send an increase pressure command. The pump motor 142 can be energized in response to the increase pressure command and send air to the designated one of the air chambers 114A or 114B through the air tube 148A or 148B via electronically operating the corresponding valve 145A or 145B. While air is being delivered to the designated air chamber 114A or 114B in order to increase the firmness of the chamber, the pressure transducer 146 can sense pressure within the air manifold 143. Again, the pressure transducer 146 can send pressure readings to the processor 136 via the A/D converter 140. The processor 136 can use the information received from the A/D converter 140 to determine the difference between the actual pressure in air chamber 114A or 114B and the desired pressure. The processor 136 can send the digital signal to the remote control 122 to update display 126 in order to convey the pressure information to the user.

Figure 3:
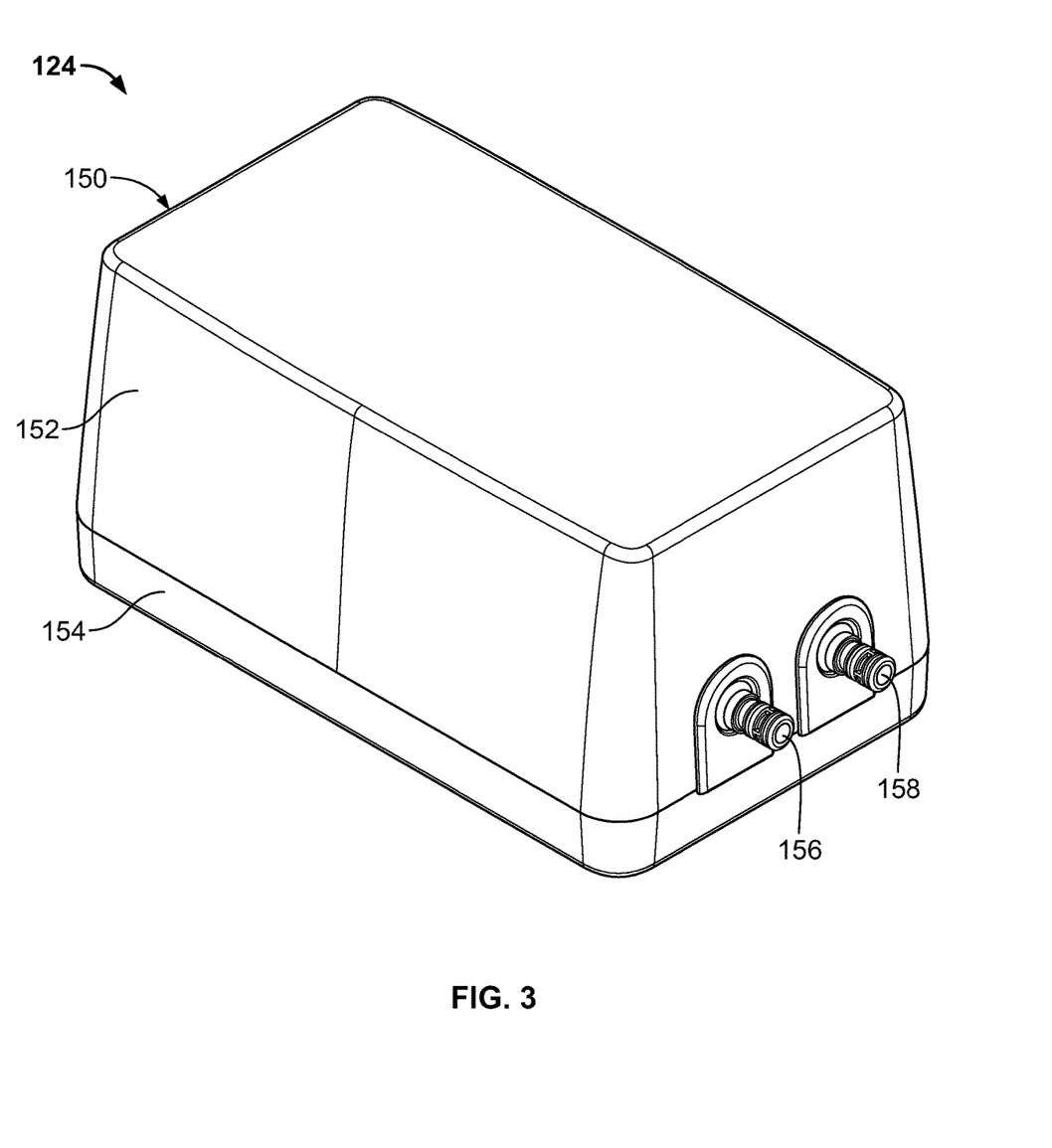
FIG. 3 is a perspective view of an air controller for use in an air bed system.

FIG. 3 is a perspective view of the air controller 124 in a housing 150. The housing 150 can include a housing top 152 and a housing bottom 154 and can substantially enclose components of the air controller 124. One or more nozzles 156 and 158 can extend through the housing 150 and can be detachably connected to the air tubes 148A and 148B (shown in FIG. 2) for inflating the air chambers 114A and 114B (shown in FIG. 2).

Figure 4:
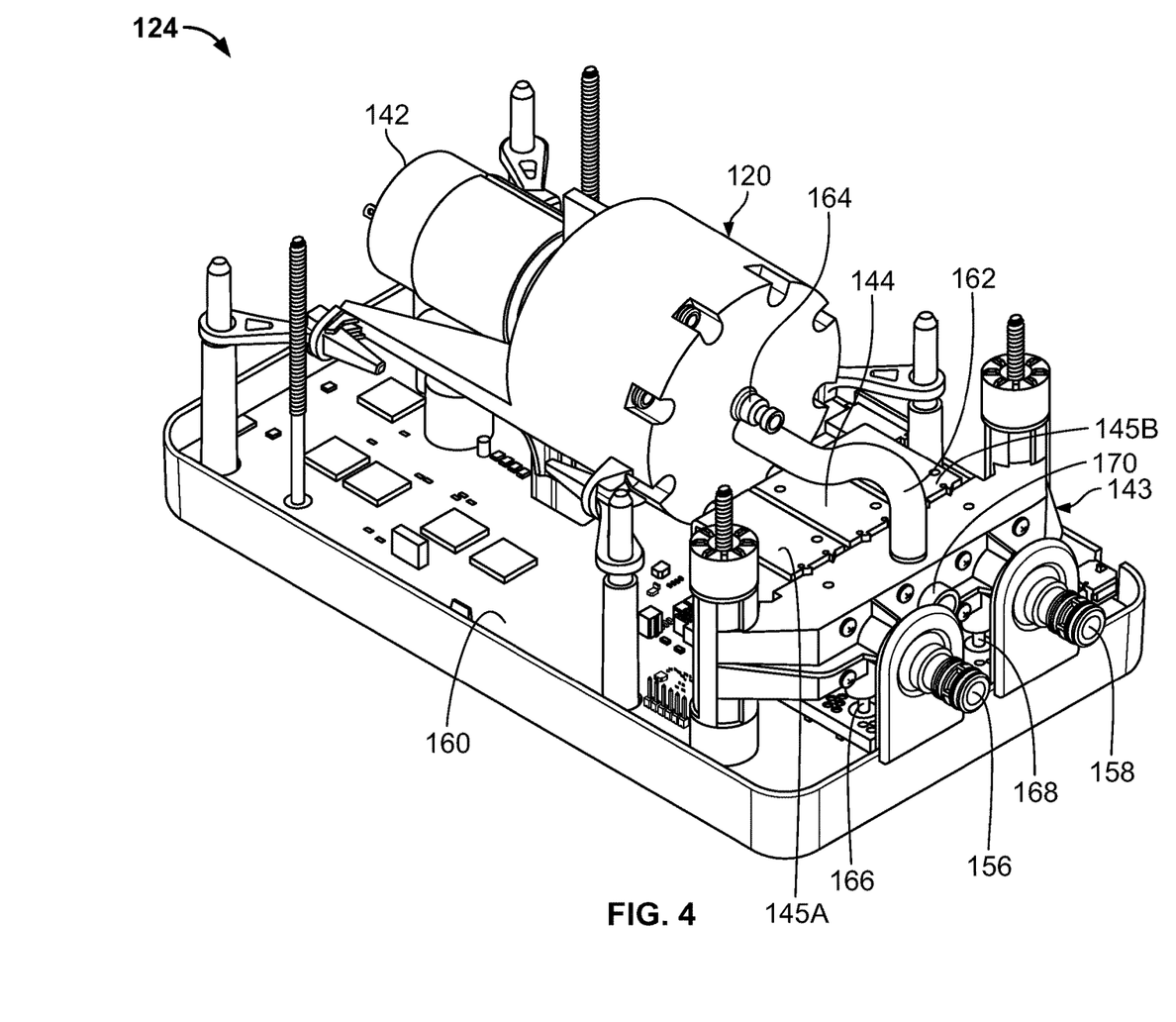
FIG. 4 is a perspective view of the air controller of FIG. 3 with a top of a housing removed.

FIG. 4 is a perspective view of the air controller 124 with the housing top 152 (shown in FIG. 3) removed so as to show internal components. As shown in FIG. 4, the housing 150 of the air controller 124 contains the pump 120 and its motor 142, the air manifold 143, and a printed circuit board 160 (which can include some or all of the power supply 134, the processor 136, the memory 137, the switching mechanism 138, the A/D converter 140, and the pressure transducer 146 shown in FIG. 2).

A tube 162 can extend from a nozzle 164 of the pump 120 to the air manifold 143 for fluidly connecting the pump 120 to the air manifold 143. One or more additional tubes 166 and 168 can extend from the air manifold 143 to one or more pressure transducers 146 (shown in FIG. 2) on the printed circuit board 160.

Figure 5:
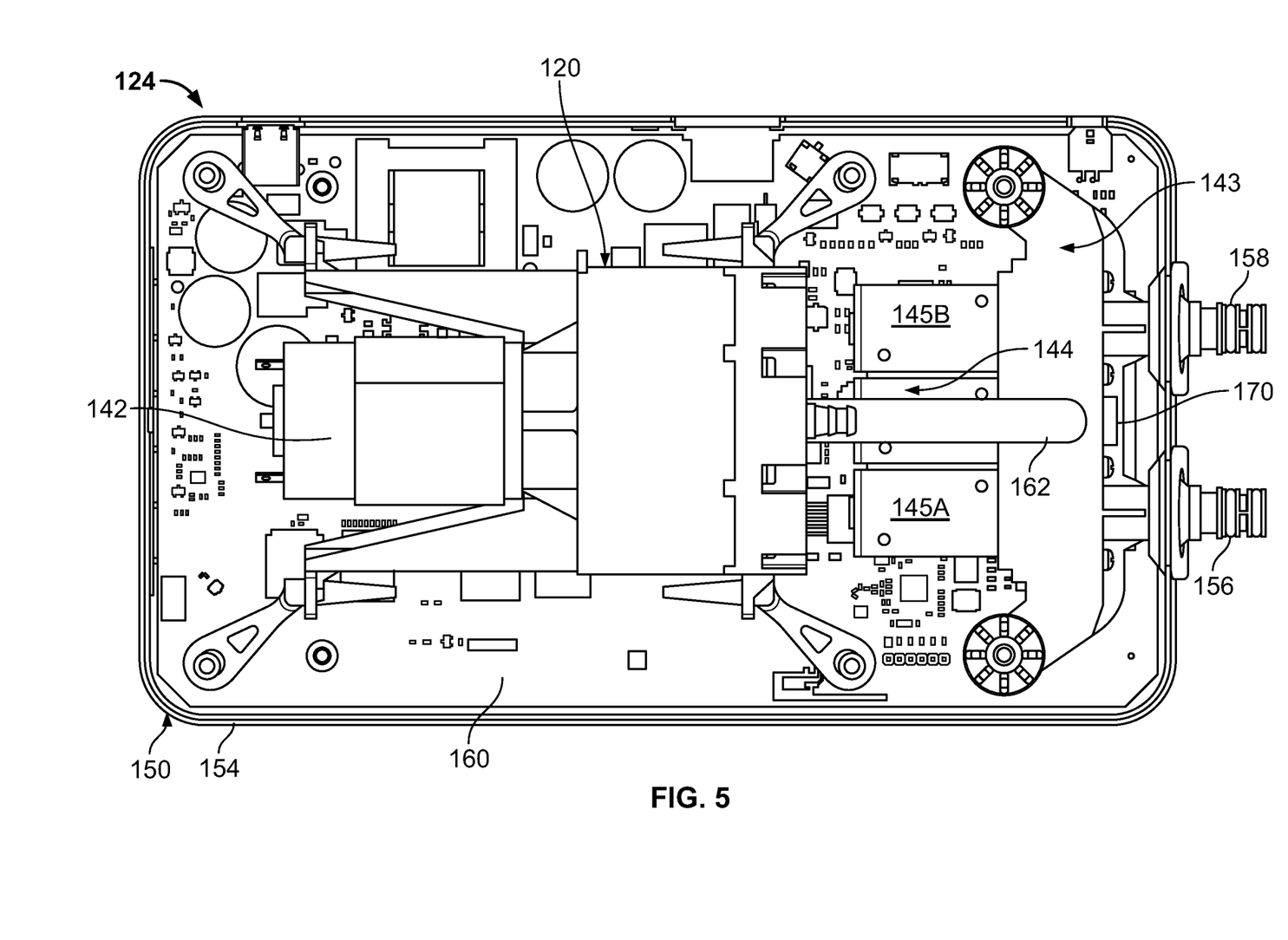
FIG. 5 is a top view of the air controller of FIG. 3 with the top of the housing removed.
Figure 6:
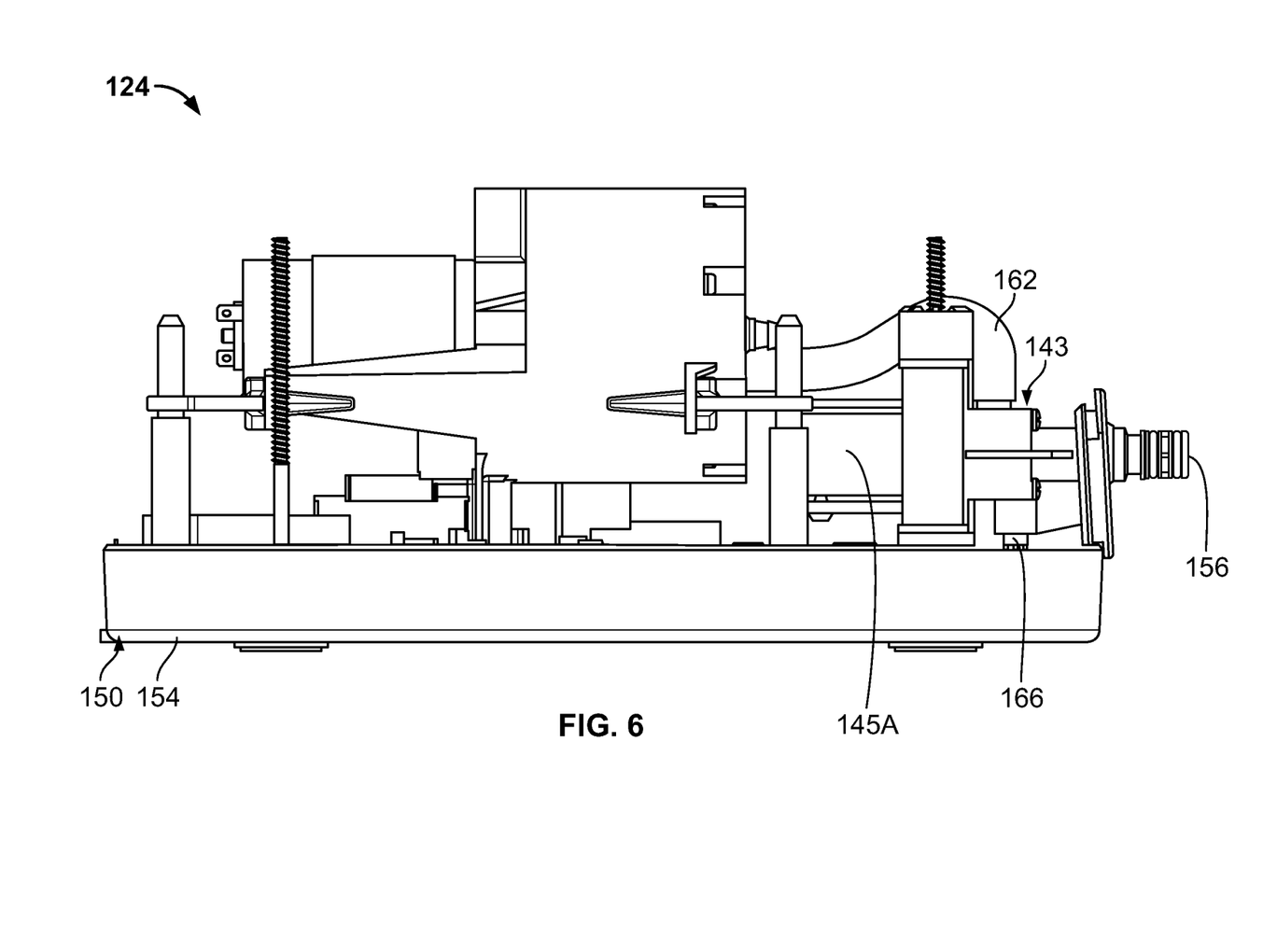
FIG. 6 is a side view of the air controller of FIG. 3 with the top of the housing removed.

FIG. 5 is a top view of the air controller 124 with the housing top 152 removed. FIG. 6 is a side view of the air controller 124 with the housing top 152 removed.

As shown in FIGS. 4-6, the air manifold 143 includes the valves 144, 145A, and 145B attached thereto. The valve 145A can be controlled to selectively open and close to allow and restrict flow through the nozzle 156 to the air chamber 114A (shown in FIGS. 1 and 2). The valve 145B can be controlled to selectively open and close to allow and restrict flow through the nozzle 158 to the air chamber 114B (shown in FIGS. 1 and 2). The valve 144 can be controlled to selectively open and close to allow and restrict flow through an outlet port 170, allowing one of the air chambers 114A and 114B to be deflated when one of their respective valves 145A and 145B is open at the same time as the valve 144. Accordingly, the air manifold 143 can selectively allow air flow between the pump 120 (via the tube 162), the air chamber 114A (via the nozzle 156), the air chamber 114B (via the nozzle 158), and the atmosphere (via the outlet port 170) depending on the open and closed status of the valves 144, 145A, and 145B.

Figure 7:
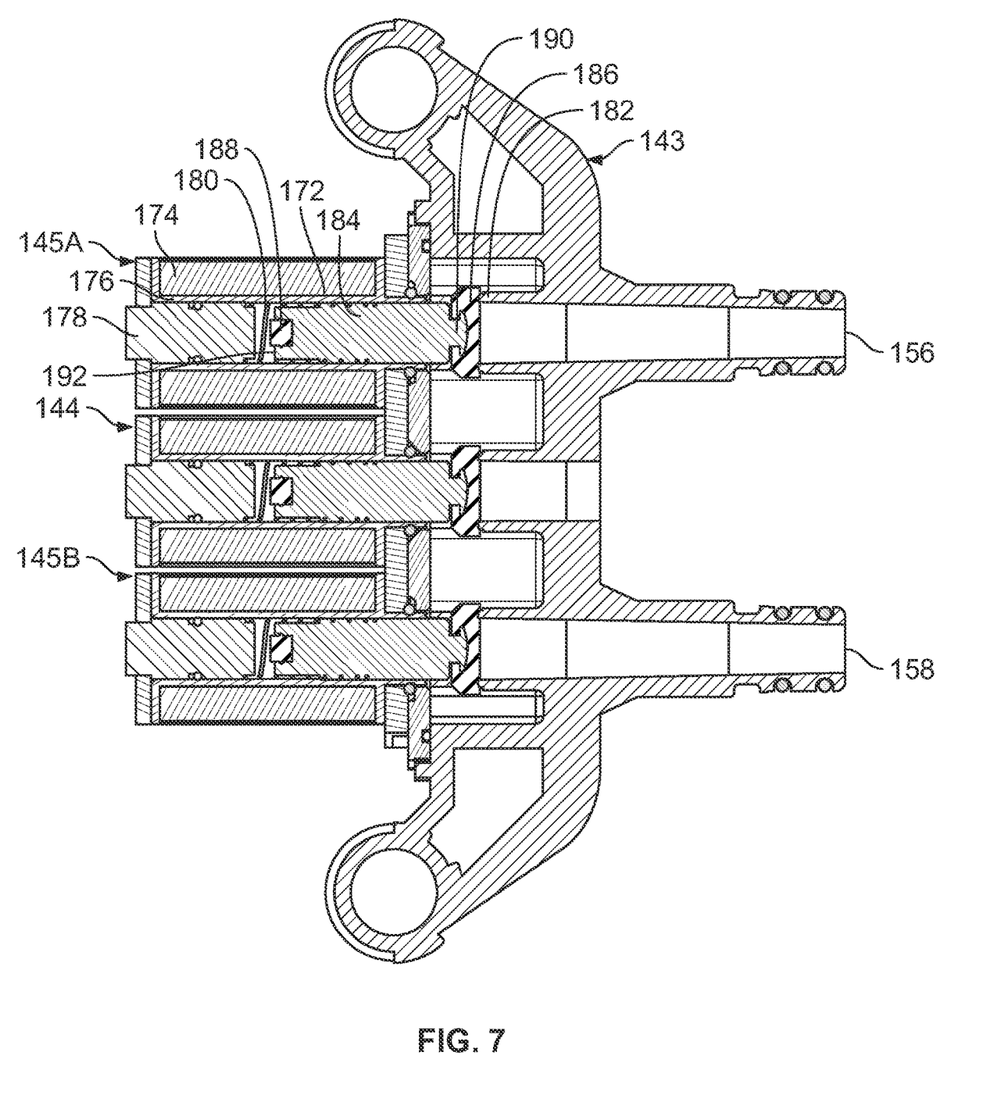
FIG. 7 is a bottom sectional view of an air manifold.

FIG. 7 is a bottom sectional view of the air manifold 143 along with the valves 144, 145A, and 145B. In the embodiment shown in FIG. 7, the valves 144, 145A, and 145B are solenoid valves each with a plunger 172. In some embodiments, the valves 144, 145A, and 145B can include some or all of the same or similar components. For example, the valve 145A can include the plunger 172, a solenoid coil 174, a core tube 176, a seal insert 178 (also called a seal column or a plug nut in some cases), a core spring 180, and a valve seat 182. The plunger 172 can include a core 184, a valve disc 186 (also called a valve member or a valve seal in some cases), and a bumper 188. The valve disc 186 is attached to the core 184 at a head 190 of the core 184 and the bumper 188 is attached to the core 184 at a tail 192 of the core 184.

The core 184 can be a metal that responds to a magnetic field (such as iron, nickel, cobalt, certain steels, and certain alloys) and that moves when the solenoid coil 174 is energized. The core 184 is positioned in the core tube 176, which the solenoid coil 174 is wrapped around. The seal insert 178 seals the core tube 176 behind the core 184 and the core spring 180 is positioned between the seal insert 178 and the core 184 in compression.

FIG. 7 shows the valves 144, 145A, and 145B in the sealed position, in which the spring 180 presses against the plunger 172 to seal the valve disc 186 against the valve seat 182. When the solenoid coil 174 is energized, it creates a magnetic field that drives the core 184 in a direction toward the tail 192 until the bumper 188 contacts the seal insert 178, at which point the plunger 172 can remain at rest in an open position. In the open position, the valve disc 186 is spaced from the valve seat 182 allowing flow through the valve seat 182 and the nozzle 156. When the solenoid coil 174 is de-energized, the compressed core spring 180 forces the plunger 172 back in the direction toward the head 190 to seal the valve seat 182 with the valve disc 186.

In some embodiments, the bumper 188 can be formed of a resilient polymer material configured to soften impact between the plunger 172 and the seal insert 178 when the valve 145A is opened. In some embodiments, the bumper 188 can be formed of hydrogenated nitrile butadiene rubber ("HNBR"), which can reliably soften impact and resist degradation under operation in the solenoid 145A. In other embodiments, the bumper 188 can be formed of another nitrile butadiene rubber ("NBR") suitable to reliably soften impact and resist degradation under operation in the valve 145A. In other embodiments, the bumper 188 can be formed of a silicone or an EDPM rubber (ethylene propylene diene monomer (M-class) rubber) having a durometer suitable effectively seal, resist wear, and reduce noise during operation of the valve 145A.

In some embodiments, the valve disc 186 can be formed of a resilient polymer material configured to seal the valve seat 182 and also to soften impact between the plunger 172 and the valve seat 182 when the valve 145A is closed. In some embodiments, the valve disc 186 can be formed of a polymer material that is different than that of the bumper 188. This can be beneficial because the valve disc 186 and the bumper 188 have different applications that benefit from different material properties. For example, the valve disc 186 can be formed of a silicone material, which is suitable for both valve sealing and for softening impact to dampen noise. In other embodiments, the valve disc 186 can be formed of another polymer material suitable for the application as a valve disc 186 in the valve 145A.

As shown in FIG. 7, the valve disc 186 of the plunger 172 can have a diameter larger than that of the valve seat 182, while the head 190 of the core 184 has a diameter less than that of the valve seat 182. Accordingly, when the plunger 172 closes with the core spring 180 forcing the core 184 toward the valve seat 182, the head 190 can tend to push further into the valve seat 182. Because the valve disc 186 is larger than the valve seat 182 and head 190 of the core 184 is smaller than the valve seat 182, the valve disc 186 can tend to bulge when the valve 145A is closed, with a center of the valve disc 186 pushing into the valve seat 182. This bulging action can further dampen the impact between the plunger 172 and the valve seat 182, as the bulging action can slow and ultimately stop movement of the core 184 more slowly than if the plunger 172 had no bulging action when the valve 145A is closed.

In some embodiments, a circumferential edge of the valve seat 182 can be radiused so as to contact the valve disc 186 with a rounded surface. For example, in some embodiments the edge of the valve seat 182 can have a radius of about 0.100 millimeter. In other embodiments, the edge of the valve seat 182 can have a radius of between 0.080 and 0.120 millimeter. In still other embodiments, the edge of the valve seat 182 can have a radius of between 0.030 and 0.200 millimeters.

In embodiments in which the valve disc 186 bulges into the hole defined by the valve seat 182, a radiused edge of the valve seat 182 can have an improved contact surface against the valve disc 186.

Figure 8A:
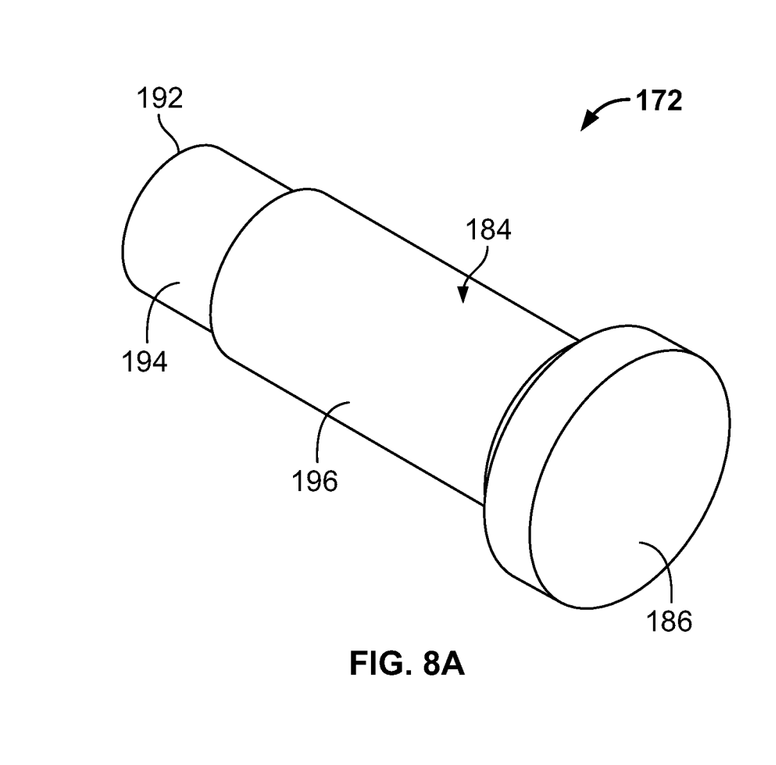
FIG. 8A and FIG. 8B are front and rear perspective views of a plunger for use in the air manifold of FIG. 7.
Figure 8B:
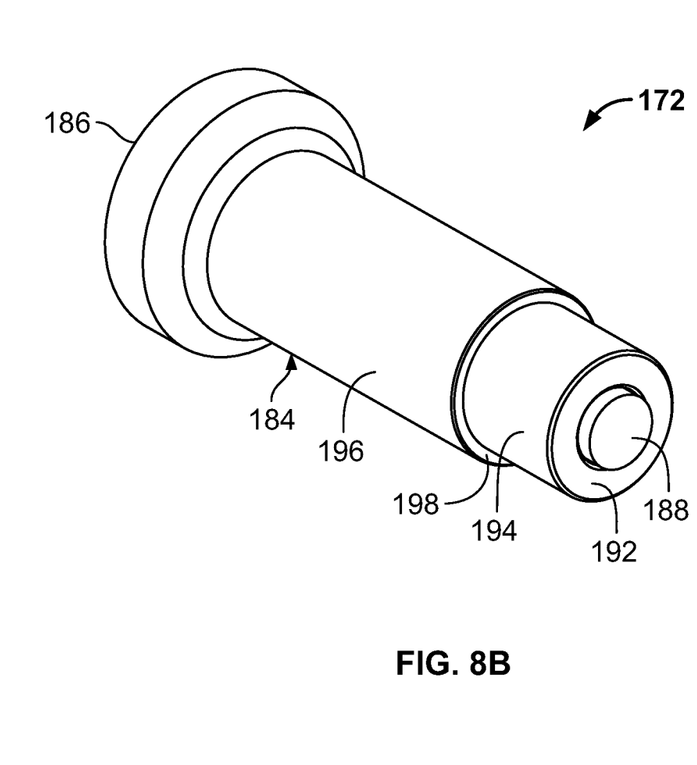

FIG. 8A is a front perspective view of the plunger 172, showing the valve disc 186 at the head 190 of the core 184 (the head 190 is shown in FIG. 7). FIG. 8B is a rear perspective view of the plunger 172, showing the bumper 188 at the tail 192 of the core 184. The core 184 can have a section 194 with a reduced diameter proximate the tail 192 and a section 196 with a diameter larger than that of section 194 proximate the head 190. The core 184 can define a shoulder 198 extending radially outward from the section 194 to the section 196, and extending circumferentially around the core 184. The core spring 180 (shown in FIG. 7) can wrap at least partially around the section 194 and can abut the shoulder 198 to push against the core 184 and bias the plunger 172 toward the closed position.

Figure 9:
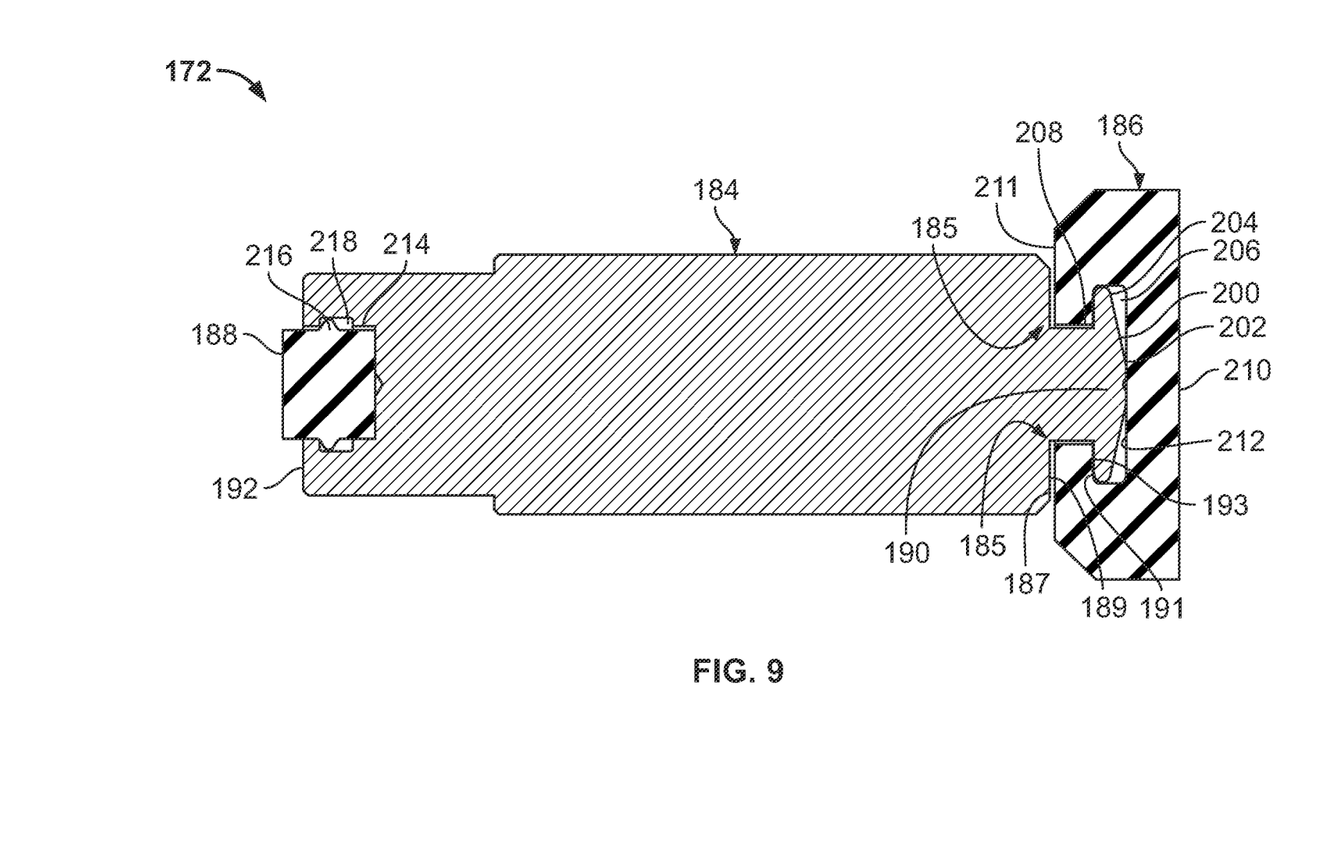
FIG. 9 is a side sectional view of the plunger of FIGS. 8A and 8B.

FIG. 9 is a side sectional view of the plunger 172. As shown in FIG. 9, the head 190 can have a front surface 200 that is chamfered or rounded. The core 184 can be longer (extending further) at a center 202 of the head 190 than at a radially-outer rim 204 of the head 190. The core 184 has a core-head groove 185 having a top wall 187 defined by a bottom surface 189 of the core 184 and a bottom wall 191 defined by a top surface 193 of the head 190.

The valve disc 186 can define a receptacle 206 that is sized and configured for receiving the head 190. The valve disc 186 has a forward-facing face 210 (i.e., a forward-facing surface) and a rear-facing face 211 (i.e., a rear-facing surface). During assembly, the head 190 can extend through an opening 208 that is positioned on the rear-facing face 211, opposite of the forward-facing face 210 of the valve disc 186 and into the receptacle 206. The opening 208 can have a radius that is smaller than both the receptacle 206 and the head 190 so as to retain the head 190 in the receptacle 206 once assembled by the core-head groove 185 mechanically coupling the valve disc 186 to the head 190 and the core 184.

The front surface 200 of the head 190 can be at least partially spaced from an opposing surface 212 of the valve disc 186. For example, in some embodiments the head 190 can abut the opposing surface 212 at the center 202 of the head 190 but be spaced from the opposing surface 212 near the rim 204 of the head 190. In other embodiments, the head 190 can be spaced from the opposing surface 212 at both the center 202 and the rim 204 of the head 190.

The space in the receptacle 206 between the head 190 and the opposing surface 212 can cushion impact when the plunger 172 closes. For example, when the face 210 of the valve disc 186 contacts the valve seat 182 (shown in FIG. 7) near an outer perimeter of the valve disc 186, that outer perimeter of the valve disc 186 can be stopped, with the core 184 and the center of the valve disc 186 allowed to continue moving at least partially forward. Upon impact, the valve disc 186 can curve such that the head 190 continues moving forward and the space in the receptacle 206 between the head 190 and the opposing surface 212 is reduced or eliminated. This cushioning can reduce noise as a result of closing the valve 145A (and/or the valves 144 and 145B), thus allowing for quieter operation.

FIG. 9 also shows the bumper 188 positioned at the tail 192 of the core 184. In some embodiments, the core 184 can define a receptacle 214 for receiving and holding the bumper 188. The bumper 188 can have a rim 216 that extends into a groove 218 defined by the core 184 to hold the bumper 188 in place. The bumper 188 can be a projection that extends distally from the tail 192 so as to contact the seal insert 178 when the plunger 172 moves backwards, thus cushioning impact. The bumper 188 can extend from the tail 192 by a distance suitable to reduce or prevent contact between the metal portion of the tail 192 and the seal insert 178.

Figure 10:
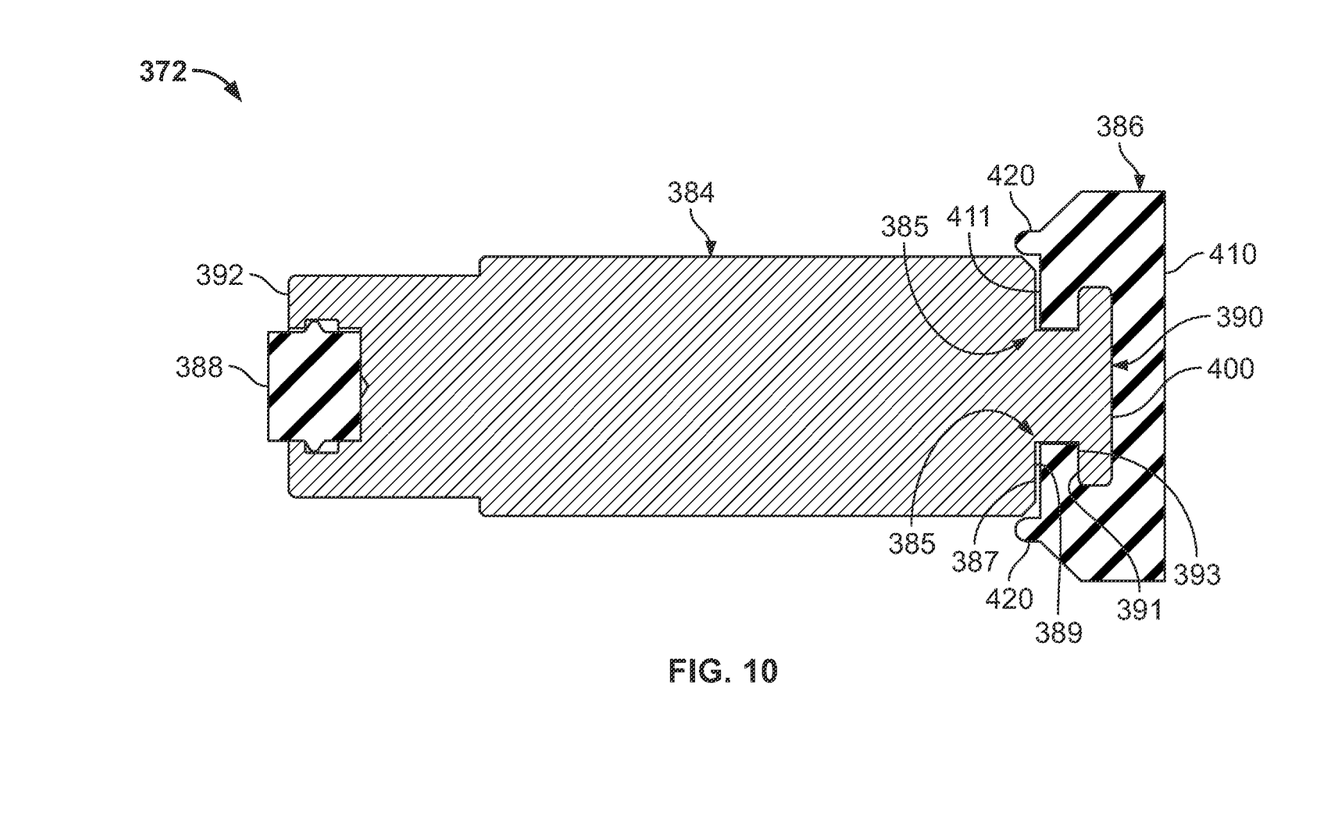
FIG. 10 is a side sectional view of another embodiment of a plunger.

FIG. 10 is a side sectional view of another embodiment of a plunger 372, including a core 384, a valve disc 386, and a bumper 388. In some embodiments, the plunger 372 can have features that are the same or similar to those of the plunger 172 (shown in FIGS. 7-9). In other embodiments, one or more features of the plunger 372 can vary as suitable for the application.

For example, in the illustrated embodiment the core 384 of the plunger 372 is shown with a head 390 that is substantially flat with little or no chamfer or rounding on its front surface 400. In other embodiments, the head 390 can be chamfered or rounded as described above with respect to the head 190 (shown in FIGS. 7-9). The core 384 has a core-head groove 385 having a top wall 387 defined by a bottom surface 389 of the core 384 and a bottom wall 391 defined by a top surface 393 of the head 390.

In some embodiments, the valve disc 386 can include one or more projections 420 sized and configured for cushioning movement of the plunger 372 in a backwards direction. For example the projections 420 can be one or more nubs that extend in a rearward direction from a rear-facing face 411 (i.e., a rear-facing surface), opposite of a forward-facing face 410 (i.e., a forward-facing surface) of the valve disc 386. When the plunger 372 is actuated open and moved in a backwards direction, the projections 420 can contact one or more structures (not shown in FIG. 10) and cushion the stoppage of the plunger 372. Accordingly, the projections 420 can function in a manner similar to that of the bumper 388, except the projections 420 need not be positioned at a tail 392 of the plunger 372.

In some embodiments, the projections 420 can be used in conjunction with the bumper 388. In other embodiments, the projections 420 can be used instead of the bumper 388 to cushion impact and reduce sound when the plunger 372 is actuated to an open position.

Accordingly, a valve for use in a pump system of an air bed can have one or more features that can reduce noise, creating a quieter operating environment. For example, valve plungers can include one or more elastomers at one or more ends configured for cushioning impact during opening and closing of a valve. A valve head can be chamfered or rounded and connect to a valve disc such that curvature of the valve head cushions impact with a valve seat. Relative size and positioning of various components (e.g., valve head, valve disc, valve seat, bumper, etc.) can allow the components to interact in a way such that motion of the valve plunger is arrested in a relatively quiet manner rather than slamming into a stopping structure.

A number of embodiments of the invention have been described. Nevertheless, it will be understood that various modifications may be made without departing from the spirit and scope of the invention. For example, various components illustrated in the air controller 124, such as the pump 120, the air manifold 143, and the printed circuit board 160, can be modified as suitable for a given application. Additionally, in some embodiments the valve plungers and their features described herein can be used in a system other than the air bed system 100 shown and described in FIGS. 1 and 2. Moreover, one or more features present on one or more of the various embodiments can be considered optional, and need not necessarily be included in all embodiments. Accordingly, other embodiments are within the scope of the following claims.

What is claimed is:

1. An air bed system comprising:
   a mattress having at least one inflatable air chamber;
   an air pump; and
   a valve in fluid connection between the air pump and the inflatable air chamber so as to selectively regulate fluid communication between the air pump and the at least one inflatable air chamber, wherein the valve comprises:
   a solenoid coil;
   a plunger having a core configured to respond to a magnetic field generated by the solenoid coil;
   a valve disc positioned at a head of the core and configured to cushion impact when the valve is closed, the valve disc defining a forward-facing surface and a rear-facing surface, wherein the valve disc defines a receptacle, wherein the head of the core is positioned in the receptacle, and wherein a front surface of the head of the core and an opposing surface in the receptacle of the valve disc are shaped to space at least part of the front surface from the opposing surface; and
   a projection attached to the rear-facing surface of the valve disc and extending in a rearward direction from the rear-facing surface away from the forward-facing surface, wherein the projection is sized and positioned to cushion impact when the valve is opened, wherein the projection extends from the rear-facing surface of the valve disc at a position that is adjacent to and along an outer surface of the core, wherein the projection is a plurality of projections.

2. The air bed system of claim 1, wherein the head of the core comprises a chamfered front surface.

3. The air bed system of claim 1, further comprising a bumper extending from a tail end of the core.

4. The air bed system of claim 3, wherein the core defines a receptacle at the tail end of the core and the bumper is positioned partially within the receptacle and extends from the tail end of the core, the bumper comprising a shoulder to fully retain the bumper within the receptacle, the projection moving in unison with the core.

5. The air bed system of claim 1, wherein the projection is one or more nubs extending from the rear-facing surface of the valve disc in the rearward direction opposite of the forward-facing surface of the valve disc.

6. The air bed system of claim 1, wherein the valve further comprises a core tube, a core spring, a seal insert, and a valve seat, wherein the core spring is positioned between the seal insert and the core so as to bias the core away from the seal insert such that the valve disc contacts the valve seat when the solenoid coil is not energized.

7. The air bed system of claim 5, wherein the valve further comprises a core tube, a core spring, a seal insert, and a valve seat, wherein the valve is configured to, when the solenoid coil is energized, compress the core spring until a bumper abuts the seal insert such that the core spring remains in compression when a bumper abuts the seal insert and the solenoid coil is energized.

8. The air bed system of claim 1, wherein the valve comprises a valve seat having a diameter larger than that of the head of the core and less than that of the valve disc.

9. The air bed system of claim 8, wherein a circumferential edge of the valve seat has a radius of between 0.030 and 0.200 millimeters and wherein the valve disc contacts the circumferential edge when the valve is closed.

10. The air bed system of claim 1, wherein the valve disc comprises a first elastomer and the projection comprises a second elastomer different than the first elastomer.

11. The air bed system of claim 1, and further comprising means for quieting impact of the valve disc when the valve is closed.

12. The air bed system of claim 1, further comprising a core-head groove having a top wall defined by a bottom surface of the core and a bottom wall defined by a top surface of the head, a portion of the rear-facing surface of the valve disc adjacent to the bottom surface of the core, wherein the core-head groove is configured to mechanically couple the valve disc to the head and the core. is opened, wherein the projection is at least two projections.

13. The air bed system of claim 1, wherein the core defines a shoulder extending circumferentially around the core on a head side of the core.

14. The air bed system of claim 13, wherein the projection is configured to compress toward the rear-facing surface of the valve disc to cushion the impact when the valve is opened.

15. An air bed system comprising:
   a mattress having at least one inflatable air chamber;
   an air pump; and
   a valve in fluid connection between the air pump and the at least one inflatable air chamber so as to selectively regulate fluid communication between the air pump and the inflatable air chamber, wherein the valve comprises:
   a solenoid coil;
   a plunger having a core configured to respond to a magnetic field generated by the solenoid coil;
   a valve disc positioned at a head of the core and configured to cushion impact when the valve is closed, the valve disc defining a forward-facing surface and a rear-facing surface, wherein the head of the core abuts an opposing surface of the valve disc at a center of the head and is spaced from the opposing surface near a rim of the head; and
   a projection attached to the rear-facing surface of the valve disc and extending in a rearward direction from the rear-facing surface away from the forward-facing surface, wherein the projection is sized and positioned to cushion impact when the valve is opened, wherein the projection extends from the rear-facing surface of the valve disc at a position that is adjacent to and along an outer surface of the core, wherein the projection is a plurality of projections.

16. An air bed system comprising:
   a mattress having at least one inflatable air chamber;
   an air pump; and
   a valve in fluid connection between the air pump and the at least one inflatable air chamber so as to selectively regulate fluid communication between the air pump and the inflatable air chamber, wherein the valve comprises:
a solenoid coil;
a plunger having a core configured to respond to a magnetic field generated by the solenoid coil;
a valve disc positioned at a head of the core and configured to cushion impact when the valve is closed, the valve disc defining a forward-facing surface and a rear-facing surface; and a projection attached to the rear-facing surface of the valve disc and extending in a rearward direction from the rear-facing surface away from the forward-facing surface, wherein the projection is sized and positioned to cushion impact when the valve is opened, wherein the projection extends from the rear-facing surface of the valve disc at a position that is adjacent to and along an outer surface of the core, wherein the valve comprises a valve seat having a diameter larger than that of the head of the core and less than that of the valve disc, and wherein the valve is configured such that the valve disc bulges into a hole defined by the valve seat when the valve is closed.

17. The air bed system of claim 16, wherein the valve disc defines a receptacle, wherein the head of the core is positioned in the receptacle, and wherein a front surface of the head of the core and an opposing surface in the receptacle of the valve disc are shaped to space at least part of the front surface from the opposing surface.

18. A valve comprising:
a solenoid coil;
a plunger having a core configured to respond to a magnetic field generated by the solenoid coil, wherein the core defines a receptacle at a tail end of the core and wherein the receptacle includes an annular groove that has a larger diameter than portions of the receptacle forward and rearward of the annular groove;
a valve disc positioned at a head of the core and configured to cushion impact when the valve is closed; and
a projection positioned and configured to cushion impact when the valve is opened, wherein the projection comprises a bumper positioned partially within and fully retained within the receptacle and partially extending outside of the receptacle in a rearward direction, wherein a rearmost portion of the projection extends further rearward than a rearward-most portion of the core, wherein the bumper includes an annular rim positioned in the annular groove of the receptacle, wherein the annular groove of the receptacle is larger than the annular rim of the bumper and has a shape that differs from the annular rim of the bumper such that the annular groove defines space that is not filled by the annular rim, wherein the projection is configured to move in unison with the core, wherein the valve disc defines a receptacle, wherein the head of the core is positioned in the receptacle, and wherein a front surface of the head of the core and an opposing surface in the receptacle of the valve disc are shaped to space at least part of the front surface from the opposing surface.

19. The valve of claim 18, wherein the head of the core comprises a chamfered front surface such that a center of the head of the core abuts an opposing surface of the valve disc and an outer portion of the head is spaced from the opposing surface of the valve disc.

20. The valve of claim 18, wherein the valve comprises a valve seat having a diameter larger than that of the head of the core and less than that of the valve disc.

21. The valve of claim 18, wherein the valve disc comprises a first elastomer configured for dampening and sealing and the projection comprises a second elastomer different than the first elastomer.

22. The valve of claim 18, wherein the annular groove has a first axial end and a second axial end, wherein the second axial end is nearer the tail end of the core than is the first axial end, wherein the annular rim is positioned proximate the second axial end of the annular groove such that the annular rim is spaced away from the first axial end in normal operation.

23. An air bed system comprising:
a mattress having at least one inflatable air chamber;
an air pump; and
a valve in fluid connection between the air pump and the at least one inflatable air chamber so as to selectively regulate fluid communication between the air pump and the inflatable air chamber, wherein the valve comprises:
a solenoid coil;
a plunger having a core configured to respond to a magnetic field generated by the solenoid coil;
a valve disc positioned at a head of the core and configured to cushion impact when the valve is closed, the valve disc defining a forward-facing surface and a rear-facing surface; and
a projection attached to the rear-facing surface of the valve disc and extending in a rearward direction from the rear-facing surface away from the forward-facing surface, wherein the projection is sized and positioned to cushion impact when the valve is opened, wherein the projection is at least two projections.

24. The air bed system of claim 23, wherein a front surface of the head of the core and an opposing surface of the valve disc are shaped to space a portion of the front surface from the opposing surface.

25. The air bed system of claim 23, wherein a front surface of the head comprises a chamfer.

26. The air bed system of claim 23, wherein a center of the head of the core contacts the valve disc and a rim of the head is spaced apart from the valve disc.

27. The air bed system of claim 23, wherein the core further comprises a bumper extending from a tail end of the core.

28. The air bed system of claim 23, wherein each of the two projections comprise a nub extending from the rear-facing surface of the valve disc in the rearward direction opposite of the forward-facing surface of the valve disc.

* * * * *